(12) United States Patent
    Haase et al.

(10) Patent No.: US 12,643,630 B2
(45) Date of Patent: Jun. 2, 2026

(54) PLANET CARRIER RING-FREEWHEEL ASSEMBLY FOR A TRANSMISSION DEVICE OF A WHEEL HUB DRIVE COMPRISING AT LEAST ONE PLANETARY GEAR, WHEEL HUB DRIVE HAVING SUCH A PLANET CARRIER RING-FREEWHEEL ASSEMBLY AND A VEHICLE OPERATED BY WHEEL HUB DRIVE AND MUSCLE POWER

(71) Applicant: MAHLE International GmbH, Stuttgart (DE)

(72) Inventors: Robin Haase, Reinhardtsdorf (DE); Matthias Koop, Neufahrn (DE); Jan Pruegner, Dresden (DE)

(73) Assignee: Mahle International GmbH (DE)

( * ) Notice: Subject to any disclaimer, the term of this patent is extended or adjusted under 35 U.S.C. 154(b) by 489 days.

(21) Appl. No.: 18/104,786

(22) Filed: Feb. 1, 2023

(65) Prior Publication Data

US 2023/0242213 A1     Aug. 3, 2023

(30) Foreign Application Priority Data

Feb. 2, 2022     (DE) ..................... 10 2022 201 080.9

(51) Int. Cl.
    F16H 1/28          (2006.01)
    B62M 6/65          (2010.01)
    (Continued)

(52) U.S. Cl.
    CPC .............. B62M 11/02 (2013.01); B62M 6/65 (2013.01); F16H 1/28 (2013.01); F16H 55/06 (2013.01); F16H 57/082 (2013.01)

(58) Field of Classification Search
    CPC ... B62M 6/65; B62M 6/60; F16H 1/28; F16D 41/24; F16D 41/30
    See application file for complete search history.

(56) References Cited

U.S. PATENT DOCUMENTS 6,095,693 A * 8/2000 Fujiwara ............... F16D 41/067
                                                      192/41 R
8,292,053 B2 * 10/2012 Yamakawa ........... F16D 41/067
                                                      192/107 T (Continued)

FOREIGN PATENT DOCUMENTS

CN       2322888 Y     6/1999
EP       2351943 A1    8/2011
         (Continued)

OTHER PUBLICATIONS

English abstract for CN-2322888.
English abstract for JP-2012025336.
German Search Report for DE-102022201080.9, dated Sep. 12, 2022.

*Primary Examiner* — Derek D Knight

(74) *Attorney, Agent, or Firm* — Fishman Stewart PLLC

(57)          ABSTRACT

A planet carrier ring-freewheel assembly for a transmission device including a planetary gear for a wheel hub drive for a vehicle is disclosed. The assembly includes a freewheel inner ring and/or a freewheel outer ring of a freewheel device for transmitting, dependent on a direction of rotation, a net torque provided by a drive unit of the wheel hub drive to a hub housing of the wheel hub drive, and a planet carrier ring of the planetary gear structured for supporting planet gear wheels. The planet carrier ring and the freewheel inner ring and/or the free wheel outer ring are directly fixed to one another by a positive connection in a non-rotatable and tension-resistant manner.

20 Claims, 10 Drawing Sheets

(51) Int. Cl.
  B62M 11/02 (2006.01)
  F16H 55/06 (2006.01)
  F16H 57/08 (2006.01)

(56) References Cited

U.S. PATENT DOCUMENTS

| 8,376,110 | B2 * | 2/2013 | Yamamoto | B62M 6/65 |
| | | | | 180/206.6 |
| 9,308,965 | B2 * | 4/2016 | Fölmli | B62M 6/65 |
| 10,479,441 | B2 * | 11/2019 | Yamamoto | B62L 5/10 |
| 2005/0087417 | A1 * | 4/2005 | Shimomura | F02N 15/023 |
| | | | | 192/45.015 |

FOREIGN PATENT DOCUMENTS

| EP | 2562072 | A1 | 2/2013 |
| JP | 4437623 | B2 | 3/2010 |
| JP | 2012025336 | A | 2/2012 |

* cited by examiner

74

42a, 42, 40, 35

37, 66

67

74

35, 40, 42, 42a 37, 66

75 118

67

35, 40, 42, 42a 35, 40, 42, 42a

PLANET CARRIER RING-FREEWHEEL ASSEMBLY FOR A TRANSMISSION DEVICE OF A WHEEL HUB DRIVE COMPRISING AT LEAST ONE PLANETARY GEAR, WHEEL HUB DRIVE HAVING SUCH A PLANET CARRIER RING-FREEWHEEL ASSEMBLY AND A VEHICLE OPERATED BY WHEEL HUB DRIVE AND MUSCLE POWER

CROSS-REFERENCE TO RELATED APPLICATION

This application claims priority to German Application No. DE 10 2022 201 080.9 filed on Feb. 2, 2022, the contents of which are hereby incorporated by reference in its entirety.

TECHNICAL FIELD

Planet carrier ring-freewheel assembly for a transmission device of a wheel hub drive comprising at least one planetary gear, wheel hub drive having such a planet carrier ring-freewheel assembly and a vehicle operated by wheel hub drive and muscle power.

BACKGROUND

The invention relates to a planet carrier ring-freewheel assembly for a transmission device of a wheel hub drive comprising at least one planetary gear according to the preamble of claim 1. In particular, the invention also relates to a wheel hub drive having such a planet carrier ring-freewheel assembly and a vehicle operated in particular by wheel hub drive and muscle power.

A planet carrier ring-freewheel assembly of this type is known from a wheel hub drive for an electric bicycle described in CN 2322888 Y. The wheel hub drive has a housing, a motor, a step-down transmission and a ratchet wheel, wherein end covers of the motor, a stator seat, an end cover of a driving device, a toothed ring of the step-down transmission, a main drive shaft of the rotor seat and a main drive shaft of the step-down transmission are each embodied integrally. Disadvantageous in this is that the wheel hub drive is a relatively large construction axially with respect to the main drive shaft.

The object of the invention therefore consists in providing an improved or at least another embodiment of a planet carrier ring-freewheel assembly. In particular, a wheel hub drive having such a planet carrier ring-freewheel assembly and further in particular a vehicle operated by wheel hub drive and muscle power is to be proposed.

In the present invention, this object is solved in particular through the subjects of the independent claim(s). Advantageous embodiments are subject of the dependent claims and of the description.

SUMMARY

A basic idea of the invention consists in providing a planet carrier ring-freewheel assembly for a wheel hub drive optimised by measures of the function integration with respect to weight, number of parts, installation space and production costs.

Accordingly, a planet carrier ring-freewheel assembly for a transmission device comprising at least one planetary gear for a vehicle, in particular an electric bicycle, is provided, which comprises a freewheel inner ring or a freewheel outer ring of a freewheel device for transmitting, dependent on the direction of rotation, a net torque provided by a drive unit of the wheel hub drive to a hub housing, in particular a housing cover of the hub housing, of the wheel hub drive and a planet carrier ring of the planetary gear equipped for supporting planet gear wheels of a planetary gear. It is substantial that the said planet carrier ring and the said freewheel inner ring or the said freewheel outer ring are directly fixed to one another by positive connection in a non-rotatable and tension-resistant manner. In other words, the said planet carrier ring and the said freewheel inner ring and/or the said freewheel outer ring are positively fixed to one another without additional fixing means, i.e. directly. Because of this, the planet carrier ring-freewheel assembly can transmit relatively high moments and at the same time be realised with a relatively low number of components. The planet carrier ring-freewheel assembly is thus relatively compact in particular in the direction of a centre axis defined by the hub housing and light in weight.

Practically it can be provided that the said positive connection is realised in that the said planet carrier ring is moulded on to the said freewheel inner ring and/or the said freewheel outer ring as part of a moulding method, in particular a plastic injection moulding method. The planet carrier ring and the freewheel inner ring or the freewheel outer ring thus form a multi-part yet integral planet carrier ring-freewheel assembly that is permanently joined. It can be provided cost-effectively and in large quantities as part of a moulding method or an injection moulding method.

Further practically it can be provided that the said freewheel outer ring and/or the said freewheel inner ring comprises an edge toothing equipped for realising an optimal torque transmission between planet carrier ring and freewheel outer ring and/or freewheel inner ring. The said edge toothing practically comprises teeth and gaps arranged between the teeth, which are completely enclosed by the moulded-on planet carrier ring. Because of this, a circumferential positive connection is realised between the freewheel outer ring and/or the freewheel inner ring and the planet carrier ring, as a result of which a torque can be relatively efficiently transmitted from the planet carrier ring to the freewheel outer ring and/or freewheel inner ring, or vice versa.

Practically it can be provided that the said freewheel outer ring and/or the said freewheel inner ring comprises a circumferential undercut for realising an axial positive connection between planet carrier ring and freewheel outer ring and/or freewheel inner ring. The undercut can be integrated in the said edge toothing. The said undercut is practically completely filled out or enclosed by the moulded-on planet carrier ring. Because of this, an axial positive connection is realised between the freewheel outer ring and/or the freewheel inner ring and the planet carrier ring, as a result of which axial tensile forces and/or pressure forces can be relatively efficiently transmitted from the planet carrier ring to the freewheel outer ring and/or freewheel inner ring or vice versa, without the planet carrier ring being unintentionally removed axially from the freewheel outer ring and/or the freewheel inner ring.

Further practically it can be provided that the freewheel outer ring and/or the freewheel inner ring are/is realised by an annular body, which defines a freewheel outer ring centre axis. Furthermore it can be provided that the freewheel outer ring and/or the freewheel inner ring has, viewed with respect to the freewheel outer ring centre axis, axial end ring portions that are oriented opposite to one another, wherein the freewheel outer ring and/or the freewheel inner ring with one of its two axial end ring portions is touchingly arranged on a large annular surface of a single-flange or single-walled basic ring disc body of the said planet carrier ring referred to as freewheel outer ring mounting surface in the following and for realising the said positive connection, is positively fixed on the same in a positive connection region. Practically, the basic ring disc body of the planet carrier ring is moulded onto the freewheel outer ring and/or the freewheel inner ring in the positive connection region. Because of this, the planet carrier ring of the said planetary gear and the freewheel outer ring and/or the freewheel inner ring are permanently connected to one another.

Practically it can be provided that the freewheel outer ring and/or the freewheel inner ring are hardened and/or ground. Because of this, stresses can be relatively favourably absorbed by the freewheel out ring and/or the freewheel inner ring.

Further practically it can be provided that the said edge toothing is realised in the positive connection region. The said edge toothing can be realised as a circumferential edge toothing on the freewheel outer ring and/or on the freewheel inner ring. Practically, the edge toothing can be advantageously formed in a radial edge region of the freewheel outer ring and/or of the freewheel inner ring, preferentially in a radial edge region of the axial end ring portion of the freewheel outer ring and/or of the freewheel inner ring facing the planet carrier ring. In addition, it can be provided that the edge toothing is formed by wedge-shaped teeth oriented with respect to the freewheel outer ring centre axis radially to the outside and gaps arranged between the teeth. By way of this, preferred embodiments for an edge toothing are stated, by means of which an optimal torque transmission between the said planet carrier ring and the said freewheel outer ring and/or the said freewheel inner ring can be realised.

Practically, it can be provided that the said undercut is realised in the positive connection region. Furthermore, the said undercut can be realised by a circumferential groove forming an undercut, which is arranged on the freewheel outer ring and/or on the freewheel inner ring in its axial end ring portion in the positive connection region facing the planet carrier ring. Because of this, an efficient axial positive connection can be realised so that the freewheel outer ring and/or the freewheel inner ring cannot be unintentionally removed from the planet carrier ring in the axial direction.

Further practically it can be provided that on a large annular surface of an annular single-flange or single-walled basic ring disc body of the planet carrier ring also referred to as planet carrier mounting surface, support pins for supporting the planet gear wheels of the said planetary gear are arranged. It can be provided in particular that exactly three such support pins are provided, which located evenly distributed on a circular path about a planet carrier ring centre axis defined by the basic ring disc body of the planet carrier ring are arranged on the said planet carrier mounting surface and embodied integrally with the basic ring disc body. Practically, planet gear wheels equipped with a centric planet gear rolling bearing are arranged on the said support pins. The respective outer rings of this planet gear rolling bearing are practically attached to the respective planet gear wheel in a non-rotatable manner. The respective inner rings of these planet gear rolling bearings are practically arranged on the said support pins, for example by hot-staking, so that they are captively secured thereon.

Practically, it can be provided that the freewheel outer ring is produced out of a metal material, in particular an aluminium material or steel material and/or the freewheel outer ring is produced out of a metal material, in particular an aluminium material or steel material and/or the planet carrier ring is produced out of a plastic material or a composite material. Because of this, the planet carrier ring-freewheel assembly is comparatively light in weight and can be produced cost-effectively. For example, it can be produced in relatively large quantities as part of a plastic injection moulding method.

Further practically, it can be provided that the freewheel inner ring or the freewheel outer ring is non-rotatably mounted on the housing cover of a bearing ring of a housing cover of the hub housing. Further, the freewheel inner ring and the freewheel outer ring or the said planet carrier ring can be mounted via a rolling bearing arrangement on a bearing ring of a housing cover of the hub housing in a rotatably adjustable manner on the housing cover or with respect to a centre axis defined by the hub housing, on a housing pot of the hub housing from radially inside. Because of this, the planet carrier ring-freewheel assembly can be relatively easily mounted on the hub housing. The said bearing ring of the housing cover is practically formed by an annular projection arranged on a housing cover, projecting into a hub housing of the wheel hub drive surrounding a housing cover central opening of the housing cover, which ring projection, on an outer ring or inner ring surface oriented with respect to a centre axis of the wheel hub drive radially to the outside or inside, forms a first bearing seat for the freewheel inner ring or the freewheel outer ring.

According to another basic idea of the invention, which can be realised additionally or alternatively to the basic idea mentioned in the introduction, a wheel hub drive of a vehicle, in particular an electric bicycle, is proposed, which has a hub housing composed of a pot-shaped monolithic housing pot and a monolithic housing cover, which hub housing is rotatably adjustably mounted on a central hollow shaft of the wheel hub drive arranged coaxially with respect to a centre axis of the wheel hub drive, having a drive unit of an electrically operated electric motor device housed in the hub housing for providing a motor torque, a transmission device housed in the hub housing for translating the motor torque into a net torque adjustable according to gears and a coupling device housed in the hub housing for transmitting the net torque to the housing cover. The drive unit can be equipped with at least one planet carrier ring-freewheel assembly according to the preceding description assigned in particular to the transmission device and the coupling device. Because of this, the said wheel hub drive can be a relatively compact construction realised to be light in weight and provided relatively cost-effectively.

Furthermore, the electric motor device, the transmission device and the coupling device can be arranged coaxially with respect to the centre axis. It is also practical when the electric motor device, the transmission device and the coupling device are arranged axially in series with respect to the centre axis. By way of the proposed arrangement, the wheel hub drive can be realised to be relatively compact.

According to a further basic idea of the invention, which can be realised additionally or alternatively to the basic ideas mentioned further up, a vehicle, in particular an electric bicycle operated by wheel hub drive and muscle power is proposed, which has at least one wheel hub drive installed in the region of a wheel hub of a wheel of the vehicle according to the above description and a muscle power operated pedal device interacting with the wheel hub drive via a transmission gear, in particular a chain drive. Because of this, a vehicle, in particular an electric bicycle, having a wheel hub drive and pedal device is stated, wherein the said wheel of the vehicle, in particular because of the improvements of the wheel hub drive discussed above, is an axially relatively compact construction and light in weight.

In summary it should be noted: the present invention practically relates to a planet carrier ring-freewheel assembly for a transmission device of a wheel hub drive comprising at least one planetary gear for a vehicle, in particular an electric bicycle. Practically it comprises a freewheel inner ring or a freewheel outer ring of a freewheel device for the transmission, dependent on the direction of rotation, of a net torque provided by a drive unit of the wheel hub drive, to a hub housing of the wheel hub drive and a planet carrier ring of the planetary gear equipped for supporting planet gear wheels of a planetary gear. Practically it is substantial that the said planet carrier ring and the said freewheel inner ring or the said freewheel outer ring are directly fixed to one another by positive connection in a nonrotatable and tension-resistant manner.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
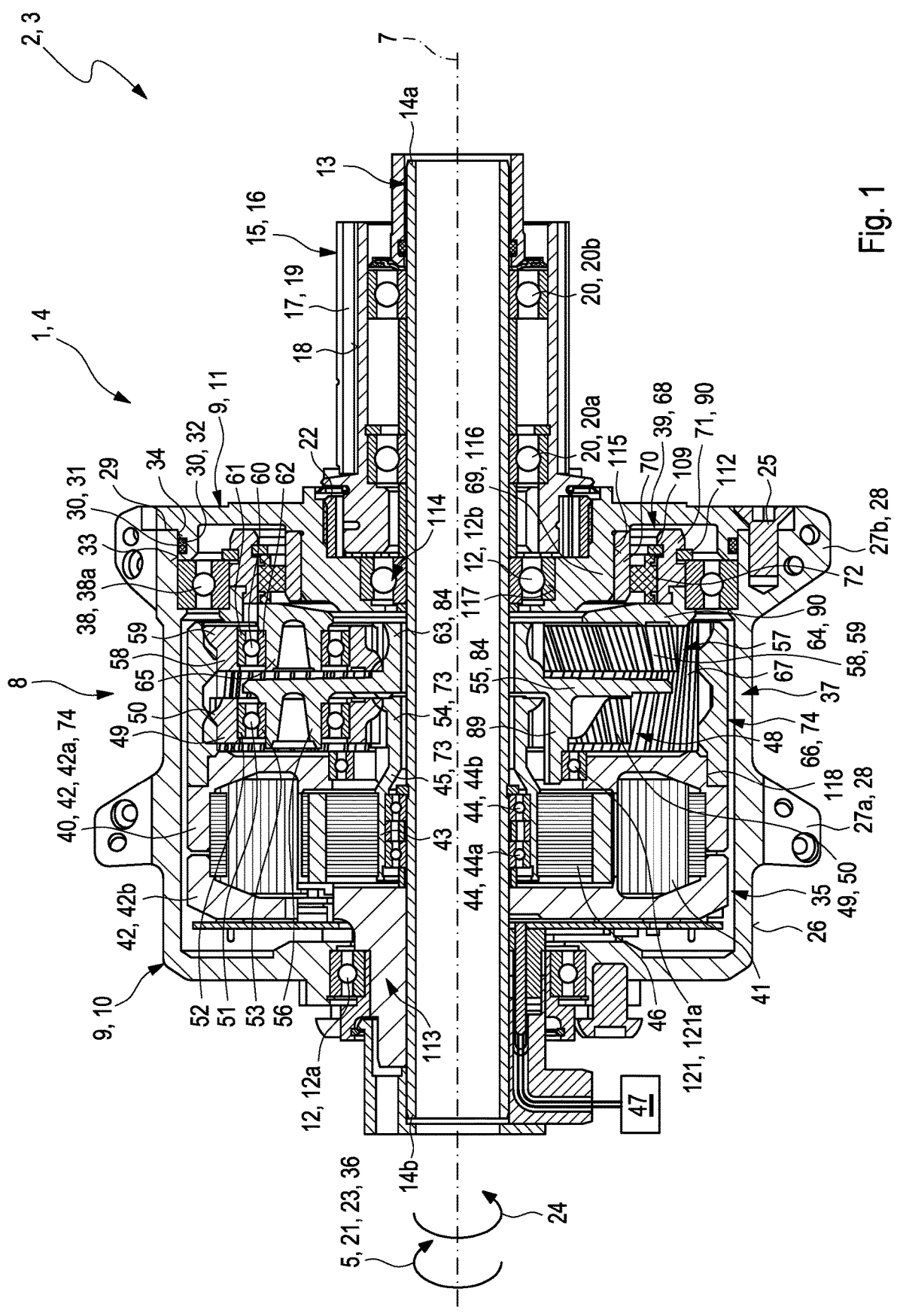
FIG. 1 a longitudinal section of a wheel hub drive 1 according to a first embodiment, FIG. 2 in a perspective view a planet carrier ring-sun gear assembly from FIG. 1 according to a preferred embodiment, FIG. 3 in a perspective view the planet carrier ring-sun gear assembly from FIGS. 1 and 2, FIG. 4 in a perspective view a planet carrier ring-freewheel assembly from FIG. 1 according to a preferred embodiment, FIG. 5 in a further perspective view the planet carrier ring-freewheel assembly from FIGS. 1 and 4, FIG. 6 a longitudinal section of the planet carrier ring-freewheel assembly from FIGS. 1, 4 and 5, FIG. 7 in a perspective view a freewheel outer ring of the planet carrier ring-freewheel assembly from FIGS. 1, 4 to 6 according to a preferred embodiment, FIG. 8 in a perspective view a stator ring-internal gear assembly from FIG. 1 according to a preferred embodiment, FIG. 9 a longitudinal section of the stator ring-internal gear assembly from FIG. 8, FIG. 10 in a perspective view a stator carrier of the electric motor device from FIG. 1 according to a preferred embodiment, FIG. 11 in a further perspective view the stator carrier from FIG. 10, FIG. 12 in a perspective view an embodiment for a primary moulding tool for producing the stator ring-internal gear assembly from FIGS. 8 and 9, by plastic injection moulding, FIG. 13 a longitudinal section of the primary moulding tools from FIG. 12, FIGS. 14 to 17 a further embodiment each of the wheel hub drive 1 in a longitudinal section.

FIGS. 1 to 17 show preferred embodiments of a wheel hub drive designated as a whole with the reference number 1 for a vehicle exemplarily realised by an electric bicycle 3, which is installed in the region of a wheel hub 4 of a wheel 2 of the electric bicycle 3, or forms the same and can practically transmit a drive torque 5 to the wheel 2.

FIG. 1 illustrates a longitudinal section through the said wheel hub drive 1 according to a first embodiment, wherein except for rolling bodies of rolling bearings not designated in more detail all components are cut open along a drawn-in dash-dotted centre axis 7, so that on the one hand internal torque paths and the constructional configuration of the components of the wheel hub drive 1 located inside, which are explained in more detail in the following, are visible.

The wheel hub drive 1 comprises a multi-part hub housing 9 housing a drive unit 8 consisting of a pot-shaped monolithic housing pot 10 and a monolithic housing cover 11. The hub housing 9 is rotatably adjustably mounted round about the centre axis 7 via a first rolling bearing arrangement 12 consisting of two separate rolling bearings 12a, 12b, in particular two commercially available simple ball rolling bearings, in a fixed-floating bearing arrangement directly or indirectly on a central hollow shaft 13 of the wheel hub drive 1 arranged coaxially with respect to the centre axis, which can be realised for example by an aluminium or steel hollow shaft. Here, the central hollow shaft 13 penetrates the housing pot 10 and the housing cover 11 of the hub housing 9 centrically in each case, practically in the region of a housing pot central opening 113 of the housing pot 10 provided for this purpose and a housing cover central opening 114 of the housing cover 11, as a result of which the central hollow shaft 13 protrudes over the hub housing 9 on both sides axially with respect to the centre axis 7 with free axial ends 14a, 14b. The one free axial end 14a can, with respect to the centre axis 7, be configured longer than, or as long as the other free axial end 14b. Furthermore, the central hollow shaft 13 is exemplarily fixed in the region of its two free axial ends 14a, 14b, to a frame of the electric bicycle 3 which is not illustrated.

In FIG. 1 it is noticeable, furthermore, that the housing cover 11, subject to forming an annular contact region 29 rotating about the centre axis 7, is supported on the housing pot 10. Practically, a seal arrangement 30 with a circumferential groove 31 introduced into the housing cover 11 and/or housing pot 10 including a sealing element 32 arranged therein is arranged in the contact region 29 between the housing cover 11 and the housing pot 10, so that the housing cover 11, here, is arranged on the housing pot 10 in a fluid-tight manner. Practically, the sealing arrangement 30 is designed as radial seal and for this purpose arranged between an annular housing cover radial bearing surface 33 oriented with respect to the centre axis 7 radially to the outside and a likewise annular housing bottom radial bearing surface 34 located radially opposite in this respect, oriented with respect to the centre axis 7 radially to the inside. Further sealing concepts can likewise be provided, for example an axial seal arranged in the contact region 29. Because of this, the drive unit 8 mentioned in the introduction can be housed by the hub housing 9 in a fluid-tight, in particular hermetically sealed manner, as a result of which for the wheel hub drive 1 proposed according to the invention, a certain water tightness can be provided, as a result of which the wheel hub drive 1 can also be used in bad weather situations without problems.

Furthermore, the wheel hub drive 1 has a profile hollow shaft 15, which is exemplarily realised by a splined hollow shaft 16 with spline profile, which with spline profile drivers 19 arranged with respect to the centre axis 7 on the profile hollow shaft circumferential lateral surface 18 arranged radially outside for establishing a positive shaft-hub connection, in particular has a commercially available sprocket set. Alternatively, the profile hollow shaft 15 can likewise be realised by a toothed hollow shaft that is not illustrated, which can also be referred to as pinion hollow shaft, with straight or helically toothed tooth shaft profile with teeth arranged with respect to the centre axis 7 on the circumferential lateral surface arranged radially outside for producing a positive shaft-hub connection. In FIG. 1 it is visible, furthermore, that the profile hollow shaft 15 is rotatably adjustably mounted round about the centre axis 7 via a second rolling bearing arrangement 20 consisting of two separate rolling bearings 20a, 20b, in particular two commercially available simple ball rolling bearings in a fixed-floating bearing arrangement on the central hollow shaft 13, in particular in the region of its free axial ends 14a, 14b or on the same. Accordingly it is possible that a commercially available sprocket set that is not illustrated for the electric bicycle 3 of sprocket wheels of different diameters with a profiling that is complementary with respect to the said spline profile 17 or tooth shaft profile can be mounted on the profile hollow shaft 15 in order to be thus able to transmit a pedal torque 21 provided on a pedal device that is not illustrated in particular by muscle power, via a pedal-operated transmission gear which is not illustrated here, in particular a chain drive, to the profile hollow shaft 15.

In FIG. 1 it is evident, furthermore, that the profile hollow shaft 15 at one end supports itself in the region of the housing cover 11 via a freewheel 22 which with respect to its design structure is not discussed further, in particular a commercially available pawl freewheel screwed into the housing cover 11 supports itself on the said housing cover 11, as a result of which the pedal torque 21 provided on the profile hollow shaft 15 can be transmitted in a circumferential direction 23 rotating about the centre axis 7 from the profile hollow shaft 15 to the housing cover 11, since the freewheel 22 then non-rotatably jams the profile hollow shaft 15 with the housing cover 11, but no moments can be transmitted in a counter-circumferential direction 24 oriented opposite with respect to the circumferential direction 23 since the freewheel 22 then slips through with low friction and enables a relative rotary movement between the profile hollow shaft 15 and the housing cover 11. The pedal torque 21 transmitted to the housing cover 11 upon a corresponding rotary adjustment of the profile hollow shaft 15 is transmitted from the housing cover 11 to the housing pot 10, for the purpose of which the housing cover 11 can be non-rotatably fixed on the housing pot 10 by means of fastening screws 25. Finally, the pedal torque 21 is provided on the wheel 2 via two separate spoke mounting rims 27a, 27b. The spoke mounting rims 27a, 27b are exemplarily configured coaxially circumferential with respect to the centre axis 7 and axially spaced apart from one another with respect to the centre axis 7 and formed by radial projections 28 integrally moulded onto an outer circumferential surface 26 of the housing pot 10 for fastening individual spokes of the wheel 2.

Making reference, further, to FIG. 1 it needs to be explained that the drive unit 8 comprises an electrically operable electric motor device 35 for providing a motor torque 36, a transmission device 37 for translating the provided motor torque 36 into a net torque and a coupling device 39 for transmitting the net torque to the housing cover 11. Because of this, the motor torque 36 provided by the electric motor device 35, converted according to a pre-set transmission ratio, to the housing cover 11 and, analogously to the pedal torque 21 explained above, be transmitted from the housing cover 11 to the housing pot 10, where it is finally provided on the wheel 2 as drive torque 5 via the two spoke mounting rims 27a, 27b. The electric motor device 35, the transmission device 37 and the coupling device 39 are practically arranged coaxially with respect to the centre axis 7 and/or axially with respect to the centre axis 7 in series.

The transmission device 37 is practically equipped to translate a provided motor torque 36 into a net torque, wherein it operates with a single, pre-set or pre-settable transmission ratio.

According to FIG. 1, the electric motor device 35 has a stator ring 40 with respect to the centre axis 7 radially outside which completely encloses the central hollow shaft 13 in the circumferential direction 23 and is configured in particular in multiple parts, and a rotor ring 43 likewise enclosing the central hollow shaft 13 in the circumferential direction 23 and located radially inside with respect to the stator ring 40, which rotor ring 43 is rotatably adjustable about the centre axis 7 with respect to the stator ring 40 and the central hollow shaft 13. The rotor ring 43 exemplarily comprises a drive hollow shaft 45 which is rotatably adjustably mounted on the central hollow shaft 13 via a third rolling bearing arrangement 44 consisting of two separate rolling bearings 44a, 44b, in particular two commercially available simple ball rolling bearings, which drive hollow shaft likewise completely encloses the central hollow shaft 13 in the circumferential direction 23. On the drive hollow shaft 45, a laminated core 46 of the rotor ring 43 with electrically shorted short-circuit bars is non-rotatably mounted. The stator ring 40 exemplarily comprises a stator 41 and a stator carrier 42 receiving the stator 41 that is non-rotatably arranged on the central hollow shaft 13. The said stator carrier 42 can be practically configured in multiple parts and/or be divided into a stator carrier pot 42a and a stator carrier cover 42b and/or be realised by a metallic stator carrier, in particular an aluminium or steel stator carrier. The electric motor device 35 can be supplied with electric energy by means of an electric connection cable 47 indicated only symbolically.

In FIG. 1 it is visible, furthermore, that the said transmission device 37, with respect to the centre axis 7, is arranged directly axially adjacent to the electric motor device 35 and formed by two separate planetary gears 48, 57, which with respect to the centre axis 7 are arranged in series. Because of this, the one planetary gear 48 of these two planetary gears 48, 57 directly faces the electric motor device 35 and is therefore referred to as first planetary gear 48 in the following, while the other planetary gear 57 of these two planetary gears 48, 57 is referred to as second planetary gear 57. Both the first planetary gear 48 and also the second planetary gear 57 each exemplarily comprise three or more planet gear wheels 49, 58, which orbit in a common internal gear 66 of the transmission device 37 which axially completely engages over the two planetary gears 48, 57 with respect to the centre axis 7 and located with respect to the centre axis 7 radially outside, wherein they each mesh with their external toothings 50, 59 with an internal toothing 67 of the internal gear 66, in particular an internal helical toothing. Thus, the internal gear 66 is a hollow-cylindrical internal gear which is jointly utilised by the planetary gears 48, 57 of the transmission device 37. The internal gear 66 can be preferably produced out of an injection-mouldable plastic material or an injection-mouldable composite material.

Figure 3:
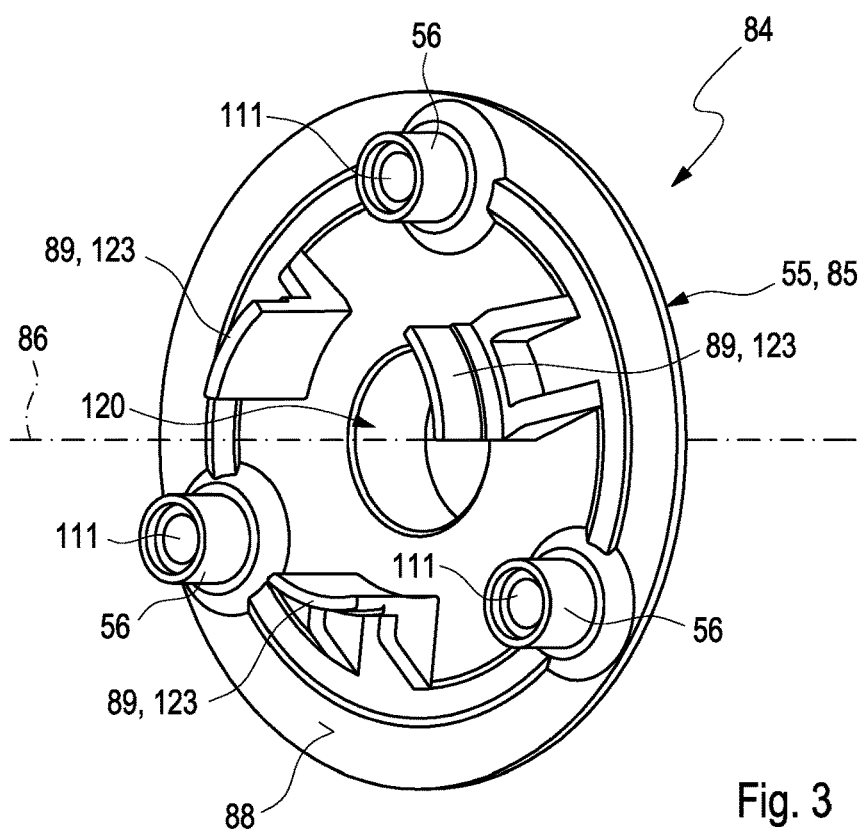

Furthermore, the three or more planet gear wheels 49 of the first planetary gear 48 mesh with their external toothings 50 with a sun gear 54 of the first planetary gear 48 located centrically with respect to the centre axis 7 and with respect to these three or more planet gear wheels 49 located radially inside. This sun gear 54 is mechanically assigned to the drive hollow shaft 45 of the electric motor device 35 so that this sun gear 54 and the drive hollow shaft 45 interact in a torque-transmitting manner. The three or more planet gear wheels 49 of the first planetary gear 48 are each equipped with a centric planet wheel rolling bearing 51, wherein the respective outer rings 52 of these planet gear rolling bearings 51 are non-rotatably attached to the respective planet gear wheel 49 and the respective inner rings 53 of these planet gear rolling bearings 51 are arranged on support pins 56 of a planet carrier ring 55 of the first planetary gear 48 equipped for supporting and guiding planet gear wheels. The inner rings 53 of these planet gear rolling bearings 51 are exemplarily connected to the respective support pins 56 of the planet carrier ring 55 by hotstaking, so that they are captively secured thereon. In FIG. 3 it is also visible that each support pin 56, for saving material and weight, can comprise a cup-like axial recess.

The three or more planet gear wheels 58 of the second planetary gear 57 continue to mesh with their respective outer toothings 59 with a sun gear 63 of the second planetary gear 57 located radially inside that is arranged centrically with respect to the centre axis 7 and these three or more planet gear wheels 58. The three or more planet gear wheels 58 of the second planetary gear 57 are each likewise equipped with a centrically arranged planet gear rolling bearing 60, analogously to the first planetary gear 48. The respective outer rings 61 of these planet gear rolling bearings 60 are non-rotatably attached to the respective planet gear wheel 58 and the respective inner rings 62 are arranged on support pins 65 of a planet carrier ring 64 of the second planetary gear 57 equipped for supporting and guiding planet gear wheels. These inner rings 62 are also exemplarily secured to the respective support pins 65 by hot-staking, so that they cannot come loose unintentionally. The planet carrier ring 64 of the second planetary gear 57 can be practically supported via a fourth rolling bearing arrangement 38, in particular a ball rolling bearing 38a, with respect to the centre axis 7 from radially inside on the housing pot 10. The sun gear 63 of the second planetary gear 57 is mechanically assigned to the planet carrier ring 55 of the first planetary gear 48 so that the planet carrier ring 55 of the first planetary gear 48 and the sun gear 63 of the second planetary gear 57 can interact in a torque-transmitting manner. The two planetary gears 48, 57 are practically arranged coaxially with respect to the centre axis 7 and/or axially with respect to the centre axis 7 in series.

In FIG. 1 it is evident, furthermore, that the said coupling device 39 is realised for transmitting the net torque from the transmission device 37 to the housing cover 11, here by a freewheel device 68, as a result of which the net torque provided by the drive unit 8 can be transmitted to the housing cover 11 dependent on the direction of rotation. Concretely this means that the net torque provided by the transmission device 37 on the freewheel device 68 on the output side can be transmitted in the circumferential direction 23 rotating about the centre axis 7 from the freewheel device 68 to the housing cover 11, since the freewheel device 68 then non-rotatably jams the transmission device 37 with the housing cover 11, but no moments can be transmitted in the counter-circumferential direction 24 oriented opposite with respect to the circumferential direction 23, since the freewheel device 68 then practically slips through without friction.

Purely exemplarily, the freewheel device 68 is constructed out of a freewheel inner ring 70 non-rotatably mounted on the housing cover 11 via a bearing ring 69 of the housing cover, in particular a metallic freewheel inner ring, further in particular an aluminium or steel freewheel inner ring, a freewheel outer ring 71, in particular a metallic freewheel outer ring, further in particular a steel freewheel outer ring and a clamping ring device 72 arranged between the freewheel inner ring 70 and the freewheel outer ring 71 which dependent on the direction of rotation jams the freewheel inner ring 70 with the freewheel outer ring 71 or releases the same. The freewheel outer ring 71 of the freewheel device 68 is practically supported via the fourth rolling bearing arrangement 38 on the housing pot 10 with respect to the centre axis 7 radially from the inside and further practically mechanically assigned to the planet carrier ring 64 of the second planetary gear 57 so that the freewheel outer ring 71 and the planet carrier ring 64 of the second planetary gear 57 can interact in a torque-transmitting manner. The said bearing ring 69 of the housing cover 11 is practically formed by a ring projection 116 surrounding the centre axis 7 about the housing cover central opening 114 arranged on the housing cover 11, which ring projection 116, on an outer ring surface oriented with respect to the centre axis 7 radially to the outside, forms a first bearing seat 115 for the freewheel inner ring 70. The ring projection 116, on an inner ring surface oriented with respect to the centre axis 7 radially to the inside, can have a second bearing seat 117 for the one rolling bearing 12b of the first rolling bearing arrangement 12.

In order to be able to produce the wheel hub drive 1 axially in the direction of the centre axis 7 in a relatively compact manner and relatively light in weight and to save costs with a minimum number of components, the invention proposes multiple constructional measures, which can be realised on a wheel hub drive 1 individually or together. According to FIGS. 1 to 13, all these measures are practically realised so that a particularly compact embodiment of the wheel hub drive 1 that is light in weight and cost-effective is provided. However, the invention practically includes also such embodiments of the wheel hub drive 1 which comprise merely one of these measures or multiple of these measures.

According to a first measure it is provided that the mechanical assignment of the sun gear 54 of the first planetary gear 48 to the drive hollow shaft 45 of the electric motor device 35 described above is constructionally solved in that the said sun gear 54 and the said drive hollow shaft 45 are realised as a monolithic unit, which in the following is referred to as sun gear shaft assembly 73. In other words, the sun gear 54 of the first planetary gear 48 is integrally embodied with the drive hollow shaft 45 of the electric motor device 35. This results in a relatively compact and durable sun gear shaft assembly 73, which additionally can be merely supported on the central hollow shaft 13 via the third rolling bearing arrangement 44, 44a, 44b, as a result of which an additional bearing for the sun gear 54 of the first planetary gear 48 can be omitted. The sun gear shaft assembly 73 can be optionally produced out of a metal material, a plastic material or a composite material.

According to a second measure it is provided that the three or more planet gear wheels 49 of the first planetary gear 48 and the three or more planetary gear wheels 58 of the second planetary gear 57 are realised as common parts. In other words, the planet gear wheels 49, 58 inserted into the two planetary gears 48, 57 are of identical design. Such common parts can generally be provided cost-effectively and in relatively large quantities. Further it can be provided that the planet gear wheels 49, 58 used in the wheel hub drive 1 are produced out of a plastic material or a composite material or a metal material. This has the advantage that compared with a metallic variant of the planet gear wheels 49, 58, which can likewise be employed in the described wheel hub drive 1, these are relatively light in weight. However, it can also be provided that the planet gear wheels 49 of the first planetary gear 48 and the planetary gear wheels 58 of the second planetary gear 57 are realised as non-common parts, in the manner that the planet gear wheels 49 of the first planetary gear 48 differ from those of the second planetary gear 57 constructionally or vice versa.

According to a third measure it is provided that the mechanical assignment of the sun gear 63 of the second planetary gear 57 to the planet carrier ring 55 of the first planetary gear 48 described above is constructionally solved in that the said planet carrier ring 55 and the said sun gear 63 form a monolithic unit, which in the following is referred to as planet carrier ring-sun gear assembly 84, see FIGS. 1 to 3. In other words, the sun gear 63 of the second planetary gear 57 is embodied integrally with the planet carrier ring 55 of the first planetary gear 48. This results in a relatively compact and durable planet carrier ring-sun gear assembly 84. Practically, the planet carrier ring-sun gear assembly 84 can be produced out of a plastic material or a composite material, as a result of which the planet carrier ringsun gear assembly 84, compared with a metallic variant of the planet carrier ring-sun gear assembly 84, which can likewise be employed in the described wheel hub drive 1, is relatively light in weight.

According to a fourth measure it is provided that the mechanical assignment of the freewheel outer ring 71 of the freewheel device 68 to the planet carrier ring 64 of the second planetary gear 57 described above is constructionally solved in that the said planet carrier ring 64 is positively arranged on the said freewheel outer ring 71, in particular moulded on. The said planet carrier ring 64 and the said freewheel outer ring 71 thus form a multi-part yet integral planet carrier ring-freewheel assembly 90 that is permanently joined, wherein the freewheel outer ring 71, as explained above, can be produced out of a metal material, in particular out of an aluminium or steel material, and the said planet carrier ring 64 out of a plastic material or a composite material. It can be provided, furthermore, that the said planet carrier ring 64, instead on the said freewheel outer ring 71, is positively arranged on the freewheel outer ring 71 of the freewheel device 68, in particular moulded on, see FIG. 15. Basically it could also be provided that the said planet carrier ring 64 is positively arranged on the freewheel outer ring 71 and the freewheel inner ring 70, in particular moulded on.

Figure 8:
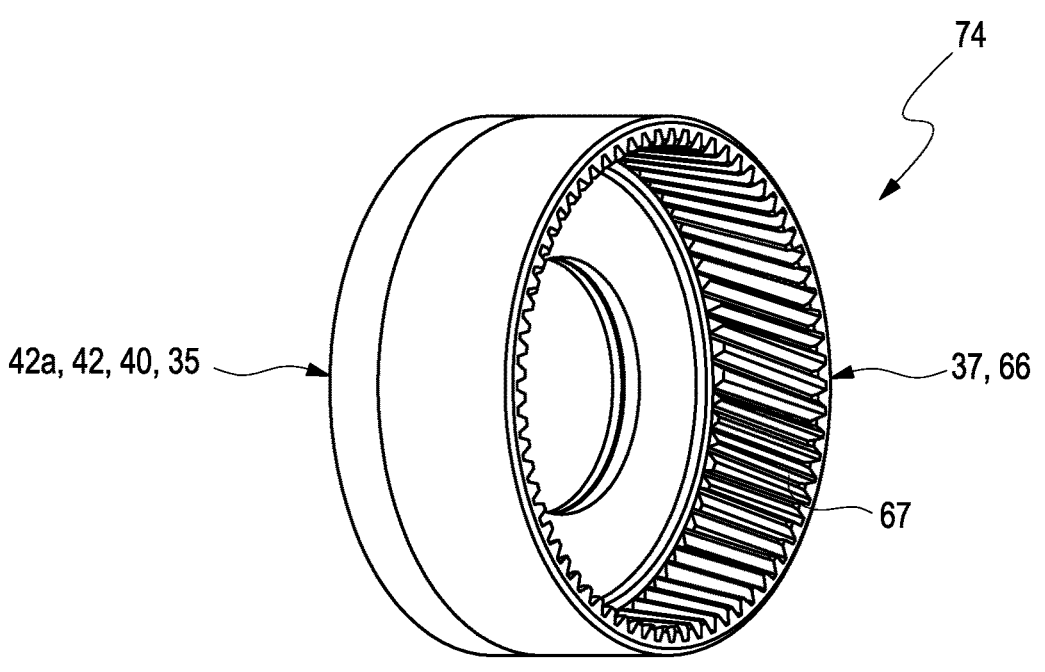
Figure 9:
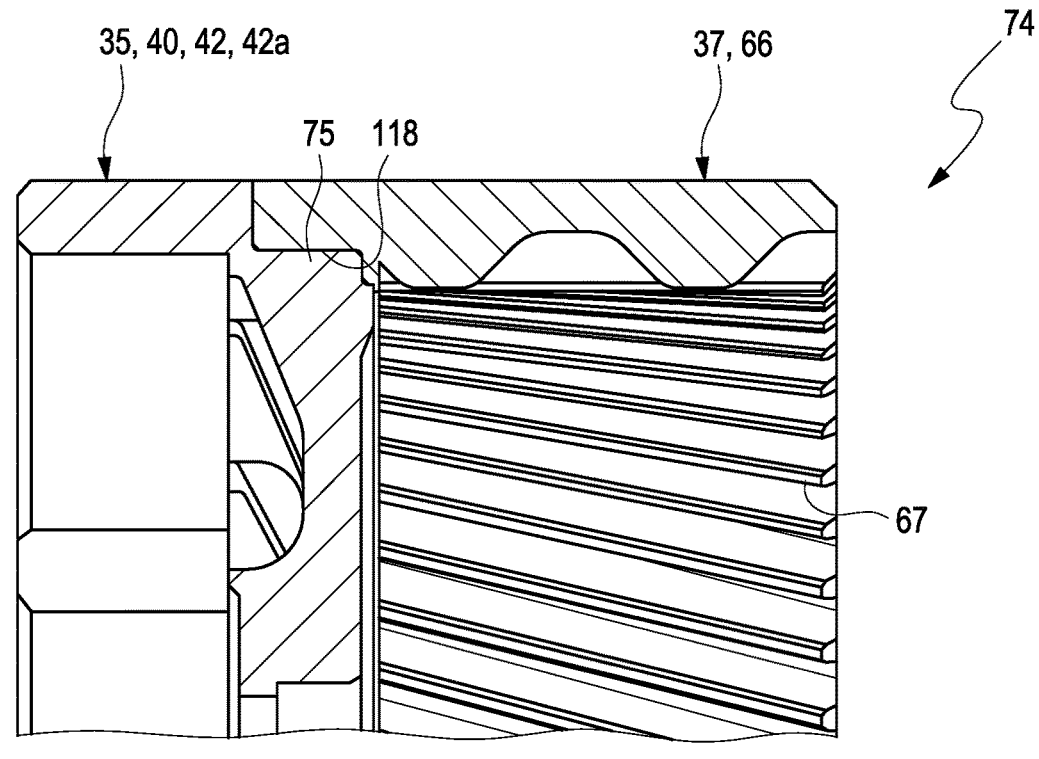
Figure 10:
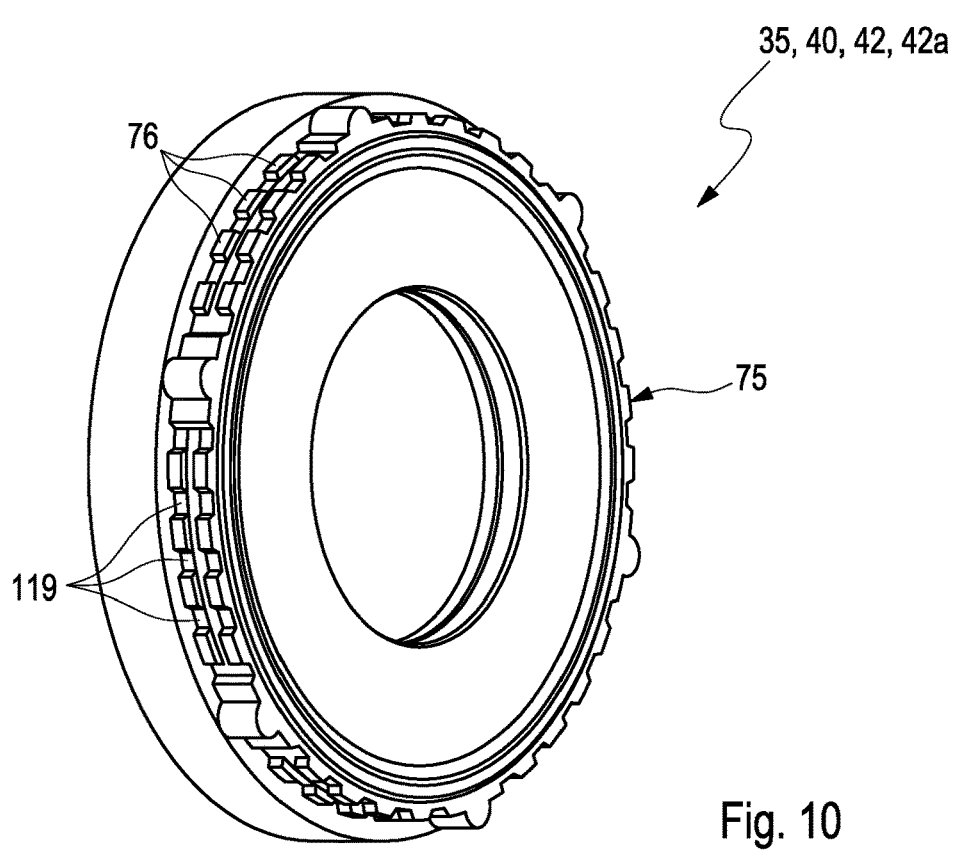
Figure 11:
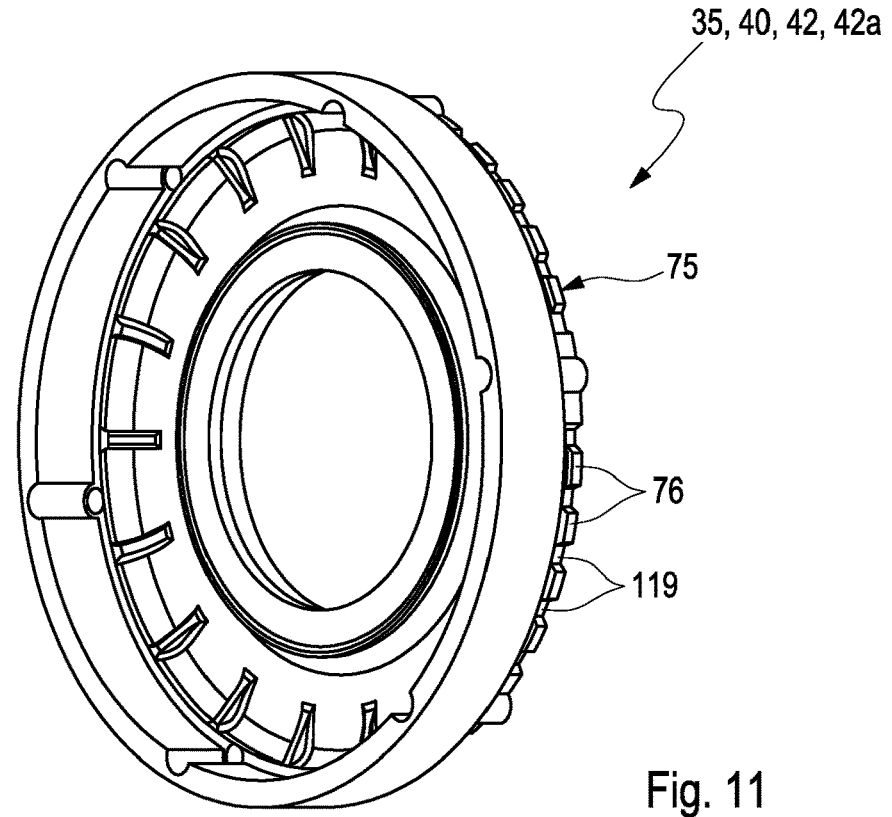

According to a fifth measure it is provided that the internal gear 66 of the transmission device 37 described above is fixed on the stator ring 40 of the electric motor device 35, for example moulded on, see FIGS. 8 and 9. In particular it can be provided that the said internal gear 66 is arranged on a stator carrier portion of the stator ring 40 located radially outside, in particular on an edge region 118 of the stator ring 40. In FIG. 1 and FIGS. 8 and 9 it is noticeable that the internal gear 66 is exemplarily arranged on the stator carrier pot 42a of the stator carrier 42, wherein it is fixed there in particular by moulding-on. Because of this, the internal gear 66 on the one hand, with respect to the stator ring 40 and the central hollow shaft 13, is non-rotatably and also axially, with respect to the centre axis 7, securely fixed on the stator ring 40, so that it cannot be axially removed from the stator ring 40. Practically, the said stator carrier 42 and the said internal gear 66 form a multi-part yet permanently joined stator ring-internal gear assembly 74.

In order to improve in particular the torque transmission between the internal gear 66 and the stator ring 40 it can be provided that the stator ring 40 or the stator carrier 42 is equipped on its side facing the first planetary gear 48 with a circumferential edge toothing 75, which is quasi-over-moulded by the internal gear 66. Practically, the edge toothing 75 is subsequently worked into the stator carrier 42 mechanically or formed by primary moulding and/or formed by in particular wedge-shaped teeth 76 oriented with respect to the centre axis 7 radially to the outside with axial extent and gaps 119 between the teeth 76, see FIGS. 10 and 11. The edge toothing 75, in particular the teeth 76, can be formed with an undercut, which is likewise over-moulded by the internal gear 66, as a result of which it is axially secured on the stator carrier 42, even better against unintentional removal. Further practically, the stator carrier 42, as explained above, can be produced out of a metal material, in particular out of an aluminium or steel material, and the internal gear 66 out of a plastic material or a composite material.

Figure 12:
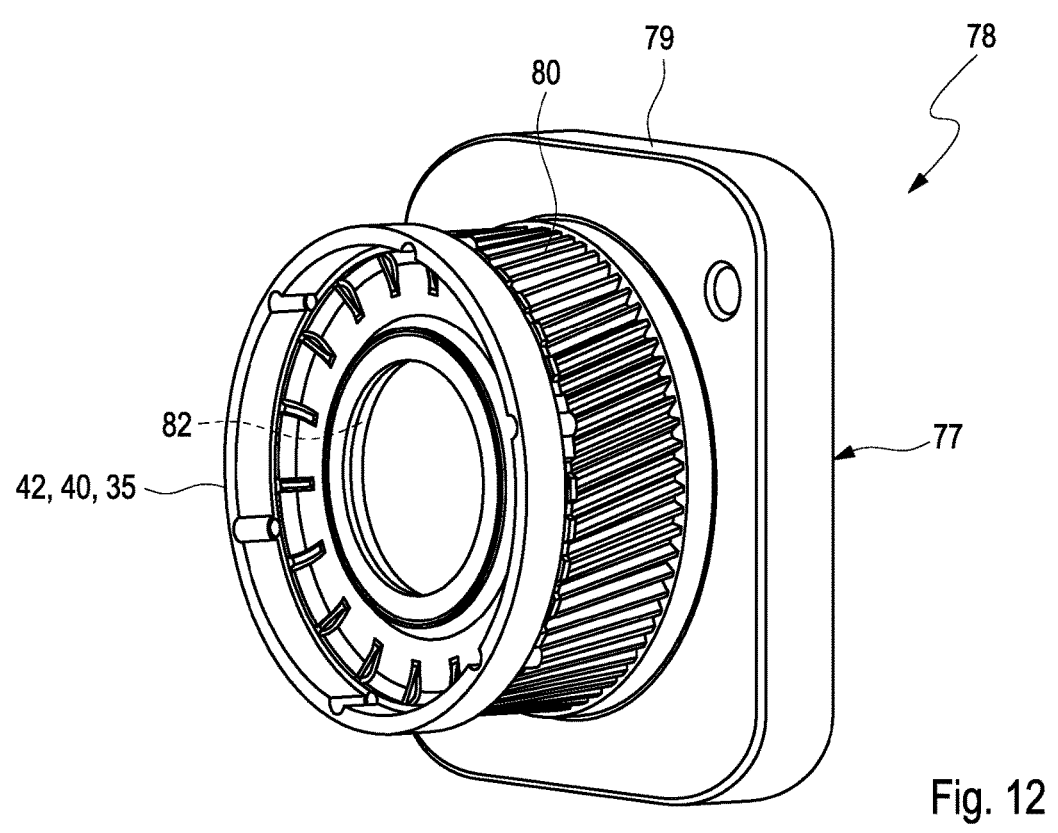
Figure 13:
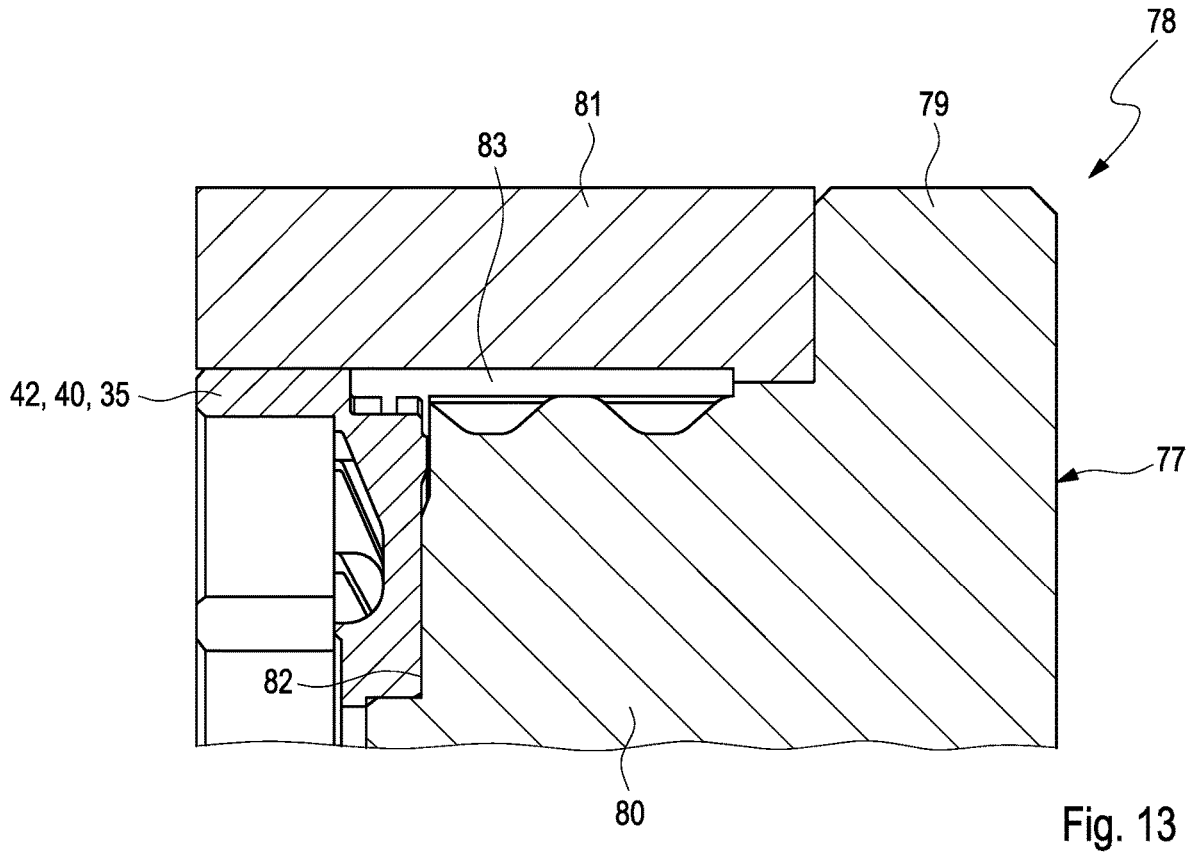

FIGS. 12 and 13 show an embodiment for a primary moulding tool 77 for producing the said internal gear 66 by injection moulding and a plastic injection moulding method 78 for producing the internal gear 66. As part of the plastic injection moulding method 78, the said primary moulding tool 77 is initially provided, which in particular comprises a negative primary mould 80 integrally fixed to a holding base 79 for the internal toothing 67 of the internal gear 66 and a further negative primary mould 81 that can be plugged on to the holding base 79 for an outer contour of the internal gear 66. Then, a prepared raw stator ring 40 or at least a prepared raw stator carrier 42 of the raw stator ring 40 is detachably attached to an annular holding portion 82 on the negative primary mould 80 prepared on the negative primary mould 80 for this purpose and the further negative primary mould 81 then arranged on the holding base 79, on the negative primary mould 80 and the raw stator ring 40 or the raw stator carrier 42 so that between the negative primary mould 80, the further negative primary mould 81 and the stator ring 40 or the stator carrier 42 an annular cavity 83 defining the contour of the internal gear 66 is formed. The same can subsequently be completely filled out with injection-mould-able plastic material via a feeder channel for plastic material arranged in the primary mould tool 77 which is not illus-trated here. Following the hardening of the injected material, the negative primary mould 80 and the further negative primary mould 81 can be removed as a result of which a multi-part yet permanently joined stator ring-internal gear assembly 74 out of a stator ring 40 or a stator carrier 42 and an internal gear 66 is provided.

Figure 2:
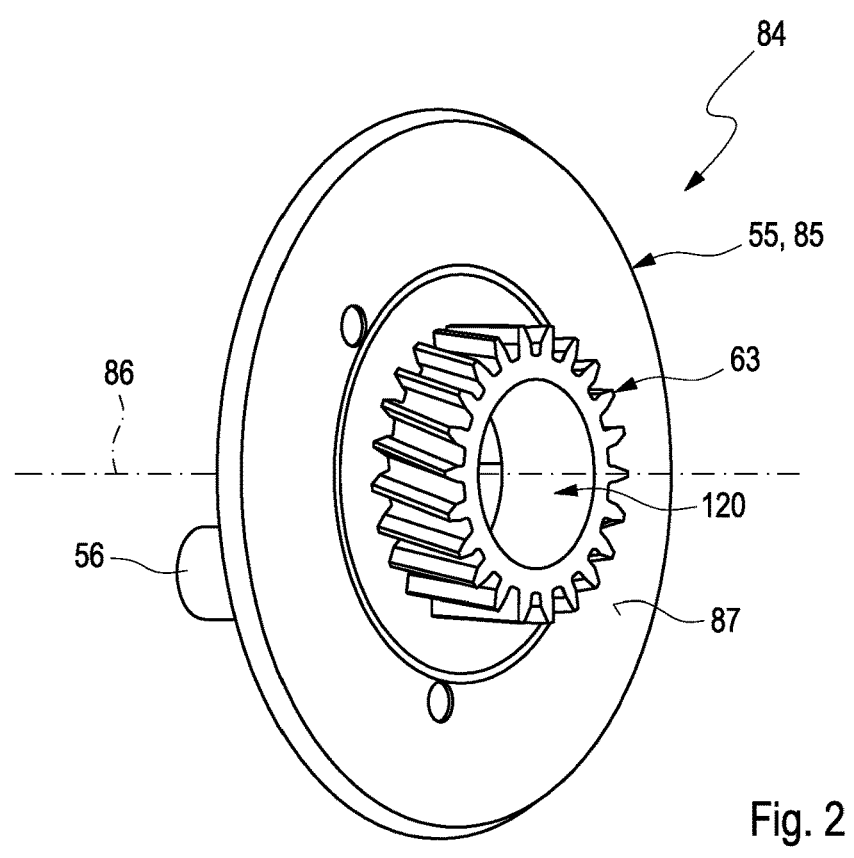

FIGS. 2 and 3 show the said planet carrier ring-sun gear assembly 84 of the wheel hub drive 1 from FIG. 1 each in a perspective view. In FIG. 2, the planet carrier ring-sun gear assembly 84 is illustrated looking at its sun gear 63 and its planet carrier ring 55. The planet carrier ring 55 is exem-plarily realised by an annular single-flange or single-walled basic ring disc body 85, which defines a planet carrier ring centre axis 86, which in the assembled state of the wheel hub drive 1 is oriented coaxially to the centre axis 7. The basic ring disc body 85, furthermore, is configured symmetrically with respect to the planet carrier ring centre axis 86 and has a central opening 120 and two large annular surfaces oriented with respect to the planet carrier ring centre axis 86 opposite to one another. The said sun gear 63 is now oriented coaxially to the planet carrier ring centre axis 86 and arranged on the front side on one of the two large annular surfaces of the basic ring disc body 85 referred to as sun gear mounting surface 87 in the following and integrally connected to the same. FIG. 3 shows the planet carrier ring-sun gear assembly 84, now looking at the large annular surface of the basic ring disc body 85 oriented opposite with respect to the sun gear mounting surface 87, which in the following is referred to as planet carrier mounting surface 88. It is noticeable that the above mentioned support pins 56 of the planet carrier ring 55 for supporting the planet gear wheels 49 are arranged located evenly distributed on a circular path about the planet carrier ring centre axis 86 on the planet carrier mounting surface 88 and are embodied integrally with the basic ring disc body 85 of the planet carrier ring 55. The term "evenly" practically means that the support pins 56, in a circumferential direction round about the planet carrier ring centre axis 86 not drawn in in FIGS. 2 and 3, are each equidistant from one another. In FIG. 3 it is noticeable, furthermore, that the planet carrier ring-sun gear assembly 84 comprises three axial bearing arms 89, which are arranged located evenly distributed on a circular path about the planet carrier ring centre axis 86 on the planet carrier mounting surface 88 and are integrally moulded onto the basic ring disc body 85, like the said support pins 56. The term "evenly" likewise means practically that the axial bearing arms 89 are each equidistant from one another in the circumferential direction round about the planet carrier ring centre axis 86 which is not drawn in. Exemplarily, the axial bearing arms 89 stand perpendicularly on the planet carrier mounting surface 88 and/or are produced out of a plastic material or a composite material, like the basic ring disc body 85 and the support pins 56. The axial bearing arms 89 are each formed exemplarily by an annular segment body 123, which with their concave sides are oriented in the direction of the planet carrier ring centre axis 86. The axial bearing arms 89, furthermore, are exemplarily arranged between two support pins 56, in particular so that in the said circumferential direction round about the planet carrier ring centre axis 86, which is not drawn in, support pins 56 and axial bearing arms 89 are alternatingly arranged. In the said circumferential direction round about the planet carrier ring centre axis 86, which is not drawn in, an identical circumferential distance can always be adjusted between the support pins 56 and the axial bearing arms 89, as a result of which adjacent support pins 56 and axial bearing arms 89 are equidistant from one another. In the assembled state of the wheel hub drive 1, the axial bearing arms 89 of the planet carrier ring-sun gear assembly 84 are axially and/or radially supported on the stator ring 40 of the electric motor device 35, in particular on the stator carrier 42 of the stator ring 40, as a result of which an advantageous mounting of the planet carrier ring-sun gear assembly 84 on the stator ring 40 is stated. In particular, the axial bearing arms 89 can be mounted on the stator ring 40 via a fifth rolling bearing arrangement 121, which is exemplarily realised by a commercially available, simple ball rolling bearing 121*a*.

FIGS. 4 to 7 show the planet carrier ring-freewheel assembly 90 described above, which is assembled from the freewheel outer ring 71 of the freewheel device 68 and from the planet carrier ring 64 of the second planetary gear 57.

Figure 4:
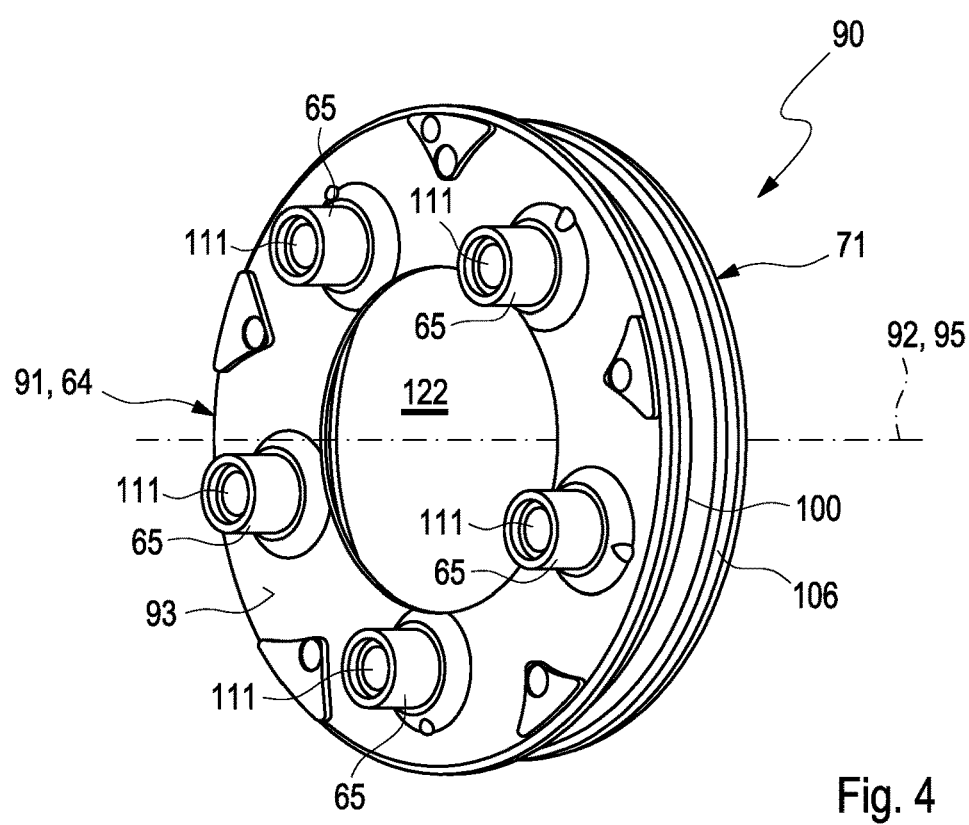
Figure 5:
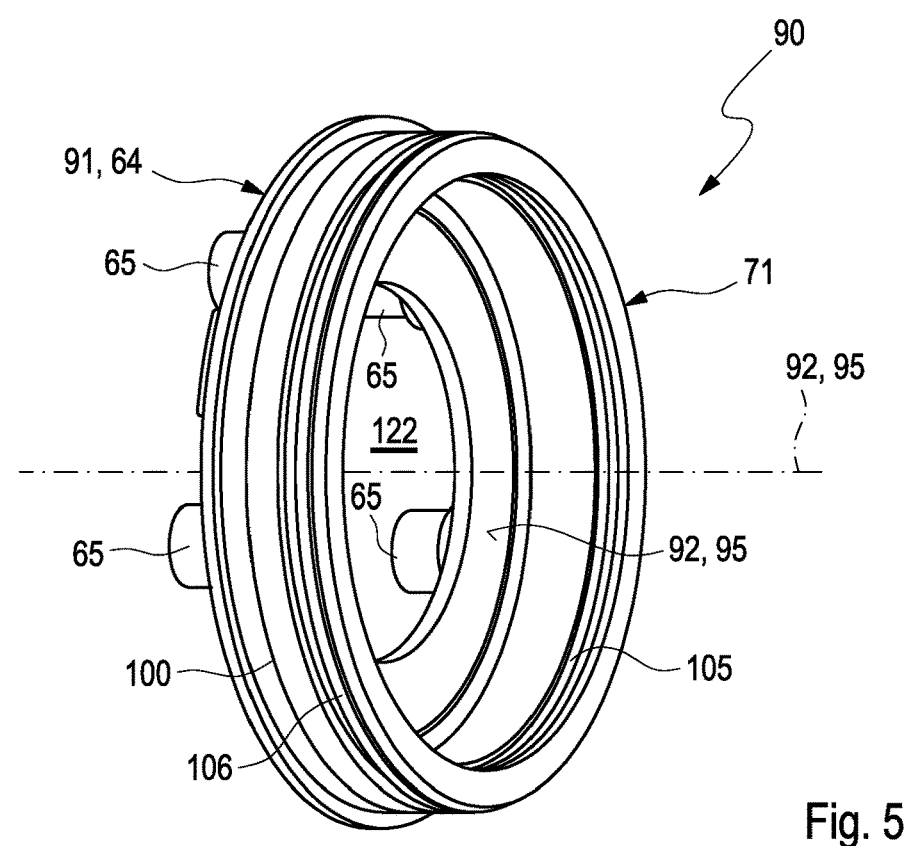

In FIG. 4, the planet carrier ring-freewheel assembly 90 is initially illustrated looking at the said planet carrier ring 64, the freewheel outer ring 71 is only noticeable in portions. The said planet carrier ring 64 is exemplarily realised by an annular, single-flange or single-walled basic ring disc body 91, which defines a planet carrier ring centre axis 92, which in the assembled state of the wheel hub drive 1 is arranged coaxially with the centre axis 7. The basic ring disc body 91 of the said planet carrier ring 64 is configured symmetrically with respect to the planet carrier ring centre axis 92 and has a central opening 122 and two large annular surfaces oriented opposite to one another with respect to the planet carrier ring centre axis 92, wherein the large annular surface visible in FIG. 4 is referred to as planet carrier mounting surface 93 in the following. It is noticeable that the above mentioned support pins 65 of the said planet carrier ring 64, for supporting the planet gear wheels 58 of the second planetary gear 57 are arranged located on the planet carrier mounting surface 93 evenly distributed on a circular path round about the planet carrier ring centre axis 92 and are embodied integrally with the basic ring disc body 91 of the planet carrier ring 64. Here, the term "evenly" practically also means that the support pins 65, in a circumferential direction round about the planet carrier ring centre axis 92, which is not drawn in in FIGS. 4 and 5, are each arranged equidistant to one another. Adjacent support pins 65 are therefore equidistant from one another.

In FIG. 5, the planet carrier ring-freewheel assembly 90 is illustrated looking at the said freewheel outer ring 71, so that the planet carrier ring 64 is only noticeable in portions. The said freewheel outer ring 71 is exemplarily realised by an annular body which has a substantially rectangular cross-section and defines a freewheel outer ring centre axis 95, which in the assembled state of the wheel hub drive 1 coaxially coincides with the centre axis 7 and in the assembled state of the planet carrier ring-freewheel assembly 90, with the planet carrier ring centre axis 92. The freewheel outer ring 71, viewed with respect to the freewheel outer ring centre axis 95, has two axial end ring portions 96, 97 oriented opposite to one another, which via a central planet carrier ring portion 98 of the freewheel outer ring 71 are integrally connected to one another. The freewheel outer ring 71 is practically configured symmetrically with respect to the freewheel outer ring centre axis 95.

In order to be able to permanently join the planet carrier ring 64 of the second planetary gear 57 to the freewheel outer ring 71, it is provided that the freewheel outer ring 71 is touchingly arranged on the basic ring disc body 91 with one of its two axial end ring portions 96 on the large annular surface of the basic ring disc body 91 of the planet carrier ring 64 oriented opposite with respect to the planet carrier mounting surface 93, and integrally joined to the said basic ring disc body 91 in a positive connection region 100. Practically, the basic ring disc body 91 of the planet carrier ring 64 is moulded onto this axial end ring portion 96 in the positive connection region 100. In order to be able to realise an optimal torque transmission between the planet carrier ring 64 and the freewheel outer ring 71, a toothing can be provided in the positive connection region 100 on the basic ring disc body 91 and/or the freewheel outer ring 71. According to FIGS. 6 and 7, such a toothing in the positive connection region 100 is exemplarily realised by a circumferential edge toothing 101 on the freewheel outer ring 71. Practically, the same can be subsequently worked in mechanically in an edge region of the body of the freewheel outer ring 71, preferably in an edge region of the axial end ring portion 64 facing the planet carrier ring 64, or formed by master-moulding and/or formed by in particular wedge-shaped teeth 102 and gaps oriented with respect to the freewheel centre axis 95 radially to the outside. The planet carrier ring-freewheel assembly 90 can, in the said positive connection region 100, additionally comprise an undercut 103 in order to realise an axial positive connection so that the freewheel outer ring 71 cannot be removed from the planet carrier ring 64 in the axial direction. To this end, it can be practically provided that the freewheel outer ring 71, in its axial end ring portion 96 facing the planet carrier ring 64 in the positive connection region 100 has a circumferential groove 104 forming an undercut, wherein the basic ring disc body 91 of the planet carrier ring 64 is moulded into this groove 104.

Figure 6:
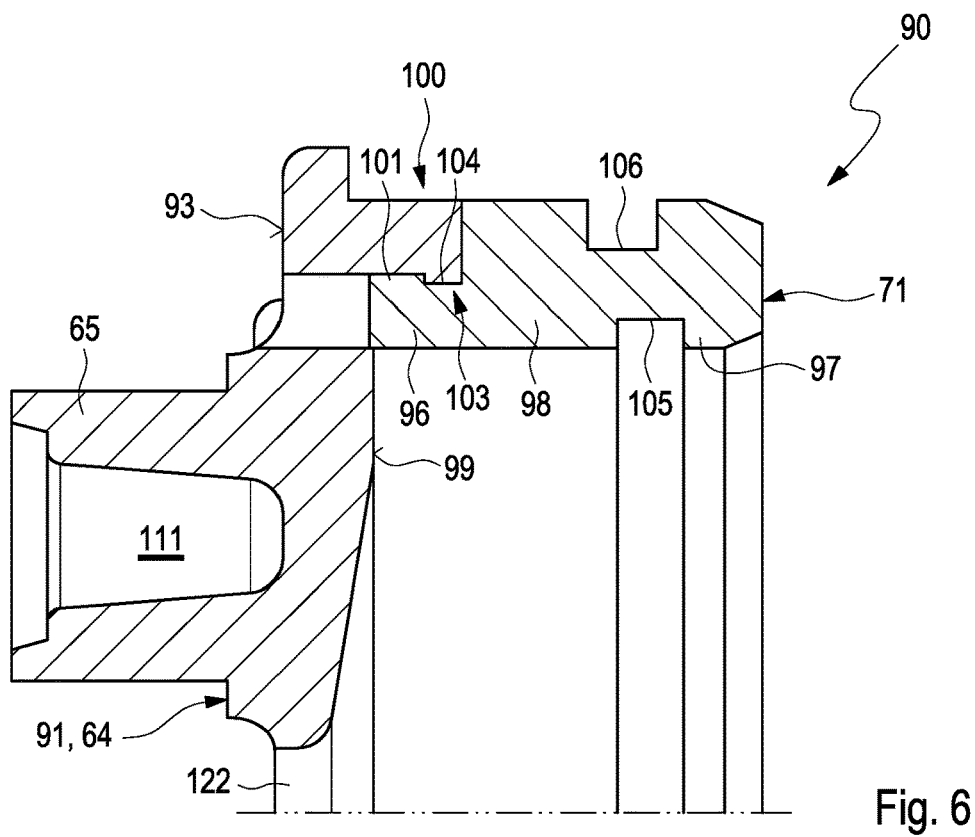
Figure 7:
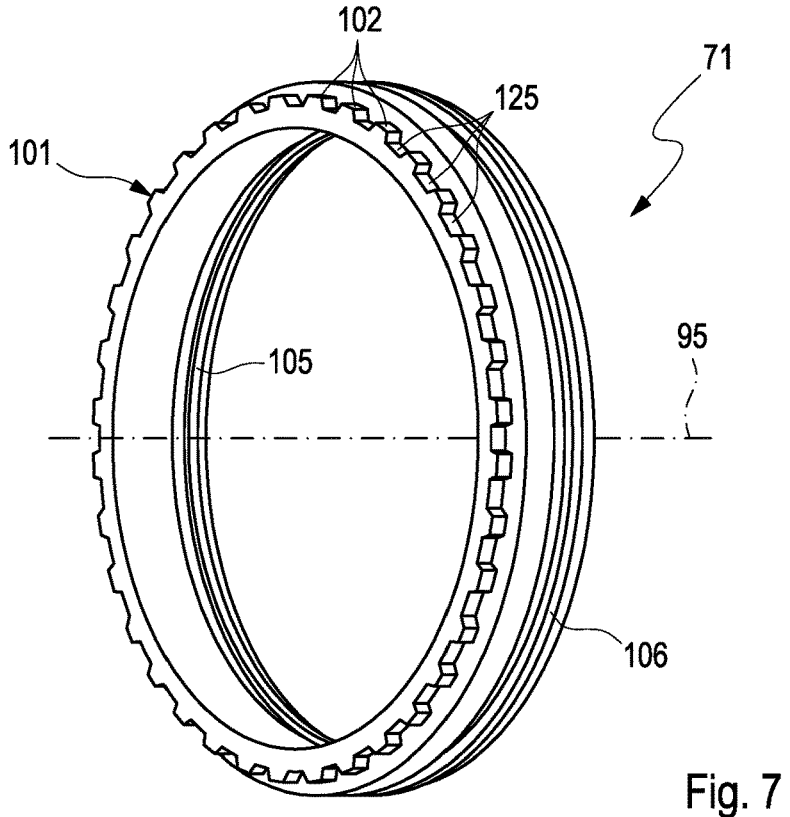

In FIG. 6 it is evident, in particular, that the planet carrier ring portion 98 of the freewheel outer ring 71 and/or the axial end ring portion 97 of the freewheel outer ring 71 not arranged in the positive connection region 100, i.e. that axial end ring portion 97 of the freewheel outer ring 71, which with respect to the axial end ring portion 96 arranged in the positive connection region 100 is oriented in opposite direction, can comprise a circumferential locking ring inner groove 105 oriented with respect to the freewheel centre axis 95 radially to the inside for a first locking ring 109 for axially locking the freewheel device 98 and a circumferential locking ring outer groove 106 oriented with respect to the freewheel centre axis 95 radially to the outside for a second locking ring 112 for axially locking the fourth rolling bearing arrangement 38. In FIG. 6 it is also evident that each support pin 65, for saving material and weight, can comprise a cup-like axial recess 111.

Figure 14:
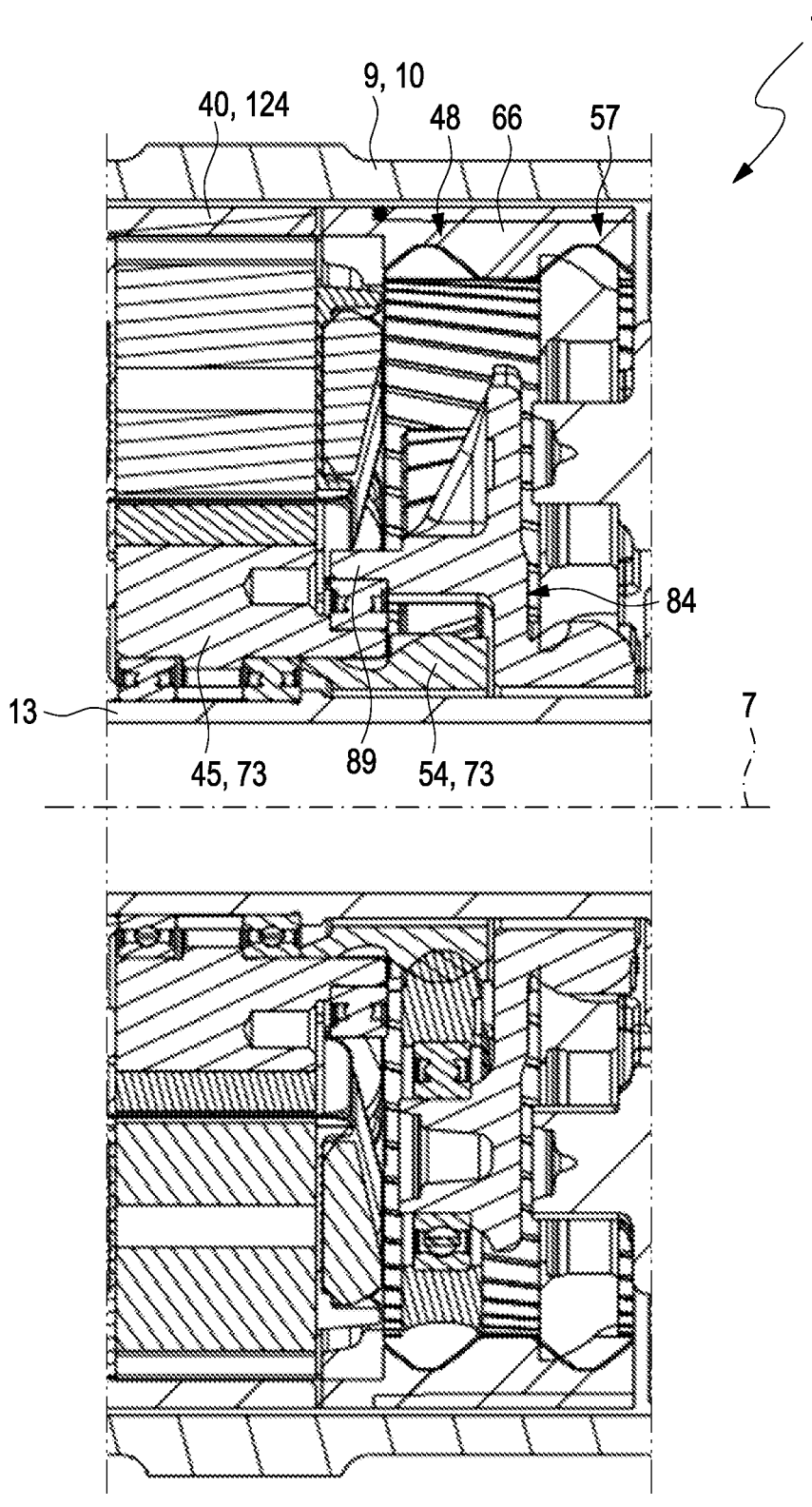

In FIG. 14, a further embodiment of the wheel hub drive 1 is shown in a longitudinal section. In contrast with the previously described embodiment of the wheel hub drive 1, the sun gear 54 of the first planetary gear 48 and the drive hollow shaft 45 of the electric motor device 35 are not embodied integrally here, but as separate components which are positively joined for example by pressing. Thus, the sun gear 54 and the drive hollow shaft 45 form a multi-part, yet integral sun gear drive hollow shaft assembly 73. Furthermore, the embodiment of the wheel hub drive 1 according to FIG. 14 differs from the preceding embodiment in that in the assembled state of the wheel hub drive 1 the axial bearing arms 89 of the planet carrier ring-sun gear assembly 84 are no longer axially and/or radially supported on the stator ring 40 of the electric motor device 35 or on the stator carrier 42 of the stator ring 40, but now on the drive hollow shaft 45 of the electric motor device 35 because of the fact that the stator ring 40 is produced by a cylinder ring body 124 out of a metal material, in particular out of an aluminium material or a steel material, a plastic material or a composite material.

Figure 15:
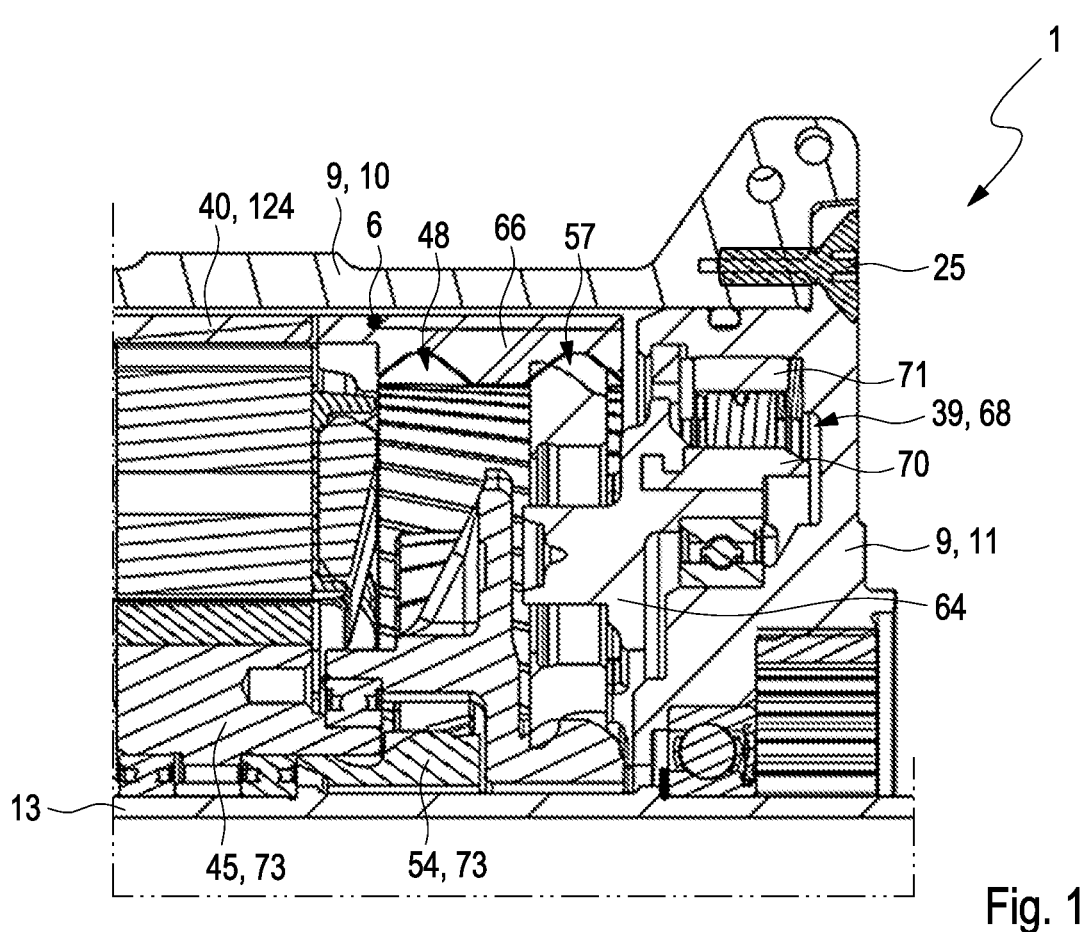

In FIG. 15, a further embodiment of the wheel hub drive 1 is shown in a longitudinal section. In contrast with the previously described embodiments of the wheel hub drive 1, the planet carrier ring-freewheel assembly 90 is realised here in that the said planet carrier ring 64, instead on the said freewheel outer ring 71, is positively arranged on the freewheel inner ring 70 of the freewheel device 68, in particular moulded on. Further, instead of by way of its freewheel inner ring 70, the freewheel device 68 is supported via its freewheel outer ring 71 on the housing cover 11. The stator ring 40 is likewise formed by a cylinder ring body 124, which is produced out of a metal material, in particular out of an aluminium material or a steel material, a plastic material or a composite material. A locking ring is indicated with reference number 6.

Figure 16:
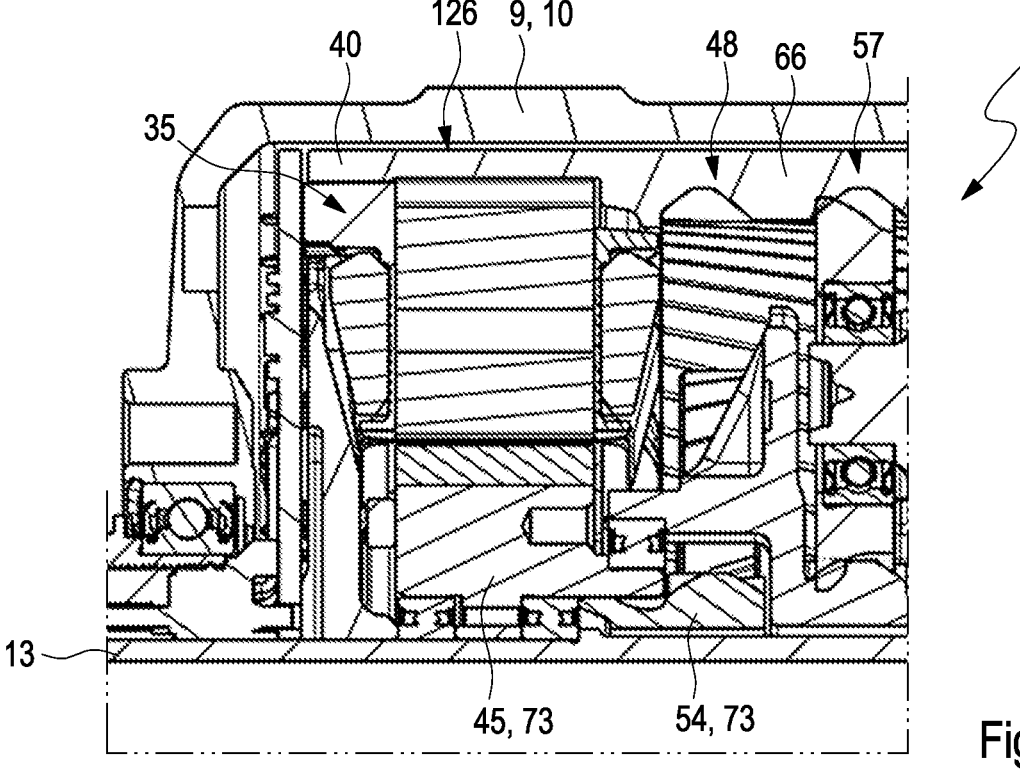
Figure 17:
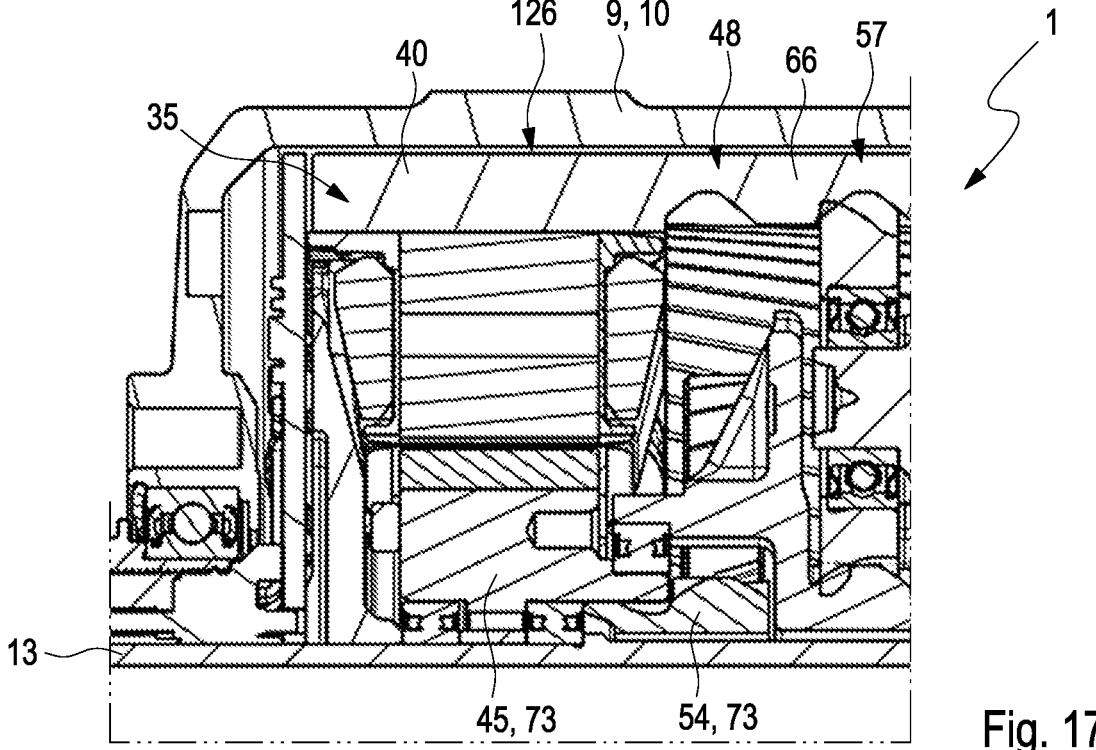

In FIGS. 16 and 17, further embodiments of the wheel hub drive 1 are shown in a longitudinal section. In contrast with the previously described embodiments of the wheel hub drive 1 it is provided here that the said stator ring 40 and the said internal gear 66 form a unit 126, in that the stator ring 40 is axially extended so that the internal gear 66 can be directly mounted, for example it can be pushed in or integrally moulded. The unit 126 can also be embodied as a monolithic unit 126, in that the said stator ring 40 and the said internal gear 66 are realised integrally. Practically, the monolithic unit 126 can be produced out of a plastic material.

The invention claimed is:

1. A planet carrier ring-freewheel assembly for a transmission device including at least one planetary gear for a wheel hub drive for a vehicle, the planet carrier ring-freewheel assembly comprising:

at least one of a freewheel inner ring and a freewheel outer ring of a freewheel device for transmitting, dependent on a direction of rotation, a net torque provided by a drive unit of the wheel hub drive to a hub housing of the wheel hub drive, a planet carrier ring of the at least one planetary gear structured for supporting planet gear wheels of the at least one planetary gear, wherein the planet carrier ring and the at least one of the freewheel inner ring and the freewheel outer ring are directly fixed to one another by a positive connection in a non-rotatable and tension-resistant manner; and wherein the at least one of the freewheel outer ring and the freewheel inner ring comprises an edge toothing structured and arranged for realising an optimal torque transmission between the planet carrier ring and the at least one of the freewheel outer ring and the freewheel inner ring.

2. The planet carrier ring-freewheel assembly according to claim 1, wherein the positive connection is provided by the planet carrier ring being moulded onto the at least one of the freewheel inner ring and the freewheel outer ring via a moulding technique.

3. The planet carrier ring-freewheel assembly according to claim 1, wherein the at least one of the freewheel outer ring and the freewheel inner ring comprise a circumferential undercut for realising an axial positive connection between the planet carrier ring and the at least one of the freewheel outer ring and the freewheel inner ring.

4. The planet carrier ring-freewheel assembly according to claim 1, wherein:

the at least one of the freewheel outer ring and the freewheel inner ring comprises an annular body that defines a freewheel outer ring centre axis, the at least one of the freewheel outer ring and the freewheel inner ring has two axial end ring portions which, viewed with respect to the freewheel outer ring centre axis, are oriented opposite one another, the at least one of the freewheel outer ring and the freewheel inner ring is touchingly arranged with one of the two axial end ring portions on a large annular surface defining a freewheel outer ring mounting surface of a single-flange or single-walled basic ring disc body of the planet carrier ring on the basic ring disc body, and positively fixed on the same for realising the positive connection in a positive connection region.

5. The planet carrier ring-freewheel assembly according to claim 1, wherein the at least one of the freewheel outer ring and the freewheel inner ring is at least one of hardened and ground.

6. The planet carrier ring-freewheel assembly according to claim 1, wherein at least one of:

the edge toothing is provided in a positive connection region, the edge toothing is provided as a circumferential edge toothing about the at least one of the freewheel outer ring and the freewheel inner ring, the edge toothing is disposed in a radial edge region of the at least one of the freewheel outer ring and the freewheel inner ring, and the edge toothing is provided by wedge-shaped teeth oriented with respect to a freewheel outer ring centre axis radially to the outside and gaps arranged between the wedge-shaped teeth.

7. The planet carrier ring-freewheel assembly according to claim 3, wherein at least one of:

the circumferential undercut is provided in a positive connection region, and the circumferential undercut is provided by a circumferential, undercut-forming groove arranged on the at least one of the freewheel outer ring and the freewheel inner ring in an axial end ring portion facing the planet carrier ring in the positive connection region.

8. The planet carrier ring-freewheel assembly according to claim 1, wherein on a large annular surface of a circular, single-flange or single-walled basic ring disc body of the planet carrier ring that defines a planet carrier mounting surface, a plurality of support pins for supporting the planet gear wheels of the at least one planetary gear are arranged.

9. The planet carrier ring-freewheel assembly according to claim 8, wherein exactly three support pins are provided, which are arranged on the planet carrier mounting surface located evenly distributed on a circular path round about a planet carrier ring centre axis defined by the basic ring disc body of the planet carrier ring and are structured integrally with the basic ring disc body.

10. The planet carrier ring-freewheel assembly according to claim 1, wherein at least one of:

the freewheel inner ring is composed of a metal material, the freewheel outer ring is composed of a metal material, and the planet carrier ring is composed of a plastic material or a composite material.

11. The planet carrier ring-freewheel assembly according to claim 1, wherein the at least one of the freewheel inner ring and the freewheel outer ring is non-rotatably mounted on a housing cover via a bearing ring of the housing cover of the hub housing.

12. A wheel hub drive of a vehicle, comprising:

a hub housing including a pot-shaped, monolithic housing pot and a monolithic housing cover that is rotatably adjustably mounted on a central hollow shaft of a wheel hub drive arranged coaxially with respect to a centre axis of the wheel hub drive, a drive unit including an electrically operated electric motor device housed in the hub housing for providing a motor torque, a transmission device housed in the hub housing for translating a motor torque into a net torque that is adjustable according to gears, and a coupling device housed in the hub housing for transmitting the net torque to the housing cover, wherein the drive unit has at least one planet carrier ring-freewheel assembly assigned to the coupling device, the at least one planet carrier ring-freewheel assembly including:

at least one of a freewheel inner ring and a freewheel outer ring of a freewheel device for transmitting, dependent on a direction of rotation, the net torque, a planet carrier ring of at least one planetary gear of the drive unit structured for supporting planet gear wheels of the at least one planetary gear, wherein the planet carrier ring and the at least one of the freewheel inner ring and the freewheel outer ring are directly fixed to one another by a positive connection in a non-rotatable and tension-resistant manner, and wherein the at least one of the freewheel outer ring and the freewheel inner ring comprises an edge toothing structured and arranged for providing an optimal torque transmission between the planet carrier ring and the at least one of the freewheel outer ring and the freewheel inner ring.

13. The wheel hub drive according to claim 12, wherein at least one of:

the electric motor device, the transmission device and the coupling device are arranged coaxially with respect to the centre axis, and the electric motor device, the transmission device and the coupling device are arranged axially with respect to the centre axis and axially with respect to the centre axis in series.

14. A vehicle operated by a wheel hub drive and muscle power, comprising:

at least one wheel hub drive arranged in a region of a wheel hub of a wheel, the at least one wheel hub drive comprising:

a hub housing including a pot-shaped, monolithic housing pot and a monolithic housing cover that is rotatably adjustably mounted on a central hollow shaft of a wheel hub drive arranged coaxially with respect to a centre axis of the wheel hub drive, a drive unit including an electrically operated electric motor device housed in the hub housing for providing a motor torque, a transmission device housed in the hub housing for translating a motor torque into a net torque that is adjustable according to gears, and a coupling device housed in the hub housing for transmitting the net torque to the housing cover, wherein the drive unit has at least one planet carrier ring-freewheel assembly assigned to the coupling device, the at least one planet carrier ring-freewheel assembly including:

at least one of a freewheel inner ring and a freewheel outer ring of a freewheel device for transmitting, dependent on a direction of rotation, the net torque, a planet carrier ring of at least one planetary gear of the drive unit structured for supporting planet gear wheels of the at least one planetary gear, wherein the planet carrier ring and the at least one of the freewheel inner ring and the freewheel outer ring are directly fixed to one another by a positive connection in a non-rotatable and tension-resistant manner, wherein the at least one of the freewheel outer ring and the freewheel inner ring comprises a circumferential undercut for providing an axial positive connection between the planet carrier ring and the at least one of the freewheel outer ring and the freewheel inner ring, and a muscle power-operated pedal device interacting with the at least one wheel hub drive via a transmission gear.

15. The vehicle according to claim 14, wherein the at least one of the freewheel outer ring and the freewheel inner ring comprises an edge toothing structured and arranged for providing an optimal torque transmission between the planet carrier ring and the at least one of the freewheel outer ring and the freewheel inner ring.

16. The vehicle according to claim 14, wherein at least one of:

the circumferential undercut is provided in a positive connection region, and the circumferential undercut is provided by a circumferential, undercut-forming groove arranged on the at least one of the freewheel outer ring and the freewheel inner ring in an axial end ring portion facing the planet carrier ring in the positive connection region.

17. The vehicle according to claim 14, further comprising a plurality of support pins for supporting the planet gear wheels provided on a large annular surface of the planet carrier ring.

18. The wheel hub drive according to claim 12, wherein the edge toothing is disposed in a radial edge region and circumferentially about the at least one of the freewheel outer ring and the freewheel inner region.

19. The wheel hub drive according to claim 12, wherein the at least one of the freewheel outer ring and the freewheel inner ring comprises a circumferential undercut for providing an axial positive connection between the planet carrier ring and the at least one of the freewheel outer ring and the freewheel inner ring, and wherein the circumferential undercut is provided by a circumferential, undercut-forming groove arranged on the at least one of the freewheel outer ring and the freewheel inner ring in an axial end ring portion facing the planet carrier ring.

20. The planet carrier ring-freewheel assembly according to claim 1, wherein at least one of (i) the at least one of the freewheel inner ring and the freewheel outer ring and (ii) the planet carrier ring is rotatably adjustably mounted on the housing cover, via a rolling bearing arrangement on a bearing ring of the housing cover of the hub housing or mounted, with respect to a centre axis defined by the hub housing, to a housing pot of the hub housing from radially inside.

* * * * *